(12) United States Patent
Lee (10) Patent No.: US 11,801,736 B2
(45) Date of Patent: Oct. 31, 2023

(54) DOOR VISOR

(71) Applicant: AUTOCLOVER CO.,LTD., Daegu (KR)

(72) Inventor: Kwan Min Lee, Daegu (KR)

(73) Assignee: AUTOCLOVER CO., LTD., Daegu (KR)

( * ) Notice: Subject to any disclaimer, the term of this patent is extended or adjusted under 35 U.S.C. 154(b) by 147 days.

(21) Appl. No.: 17/603,478

(22) PCT Filed: Jul. 9, 2021

(86) PCT No.: PCT/KR2021/008795
§ 371 (c)(1),
(2) Date: Oct. 13, 2021

(87) PCT Pub. No.: WO2022/010308
PCT Pub. Date: Jan. 13, 2022

(65) Prior Publication Data
US 2022/0219515 A1   Jul. 14, 2022

(30) Foreign Application Priority Data

Jul. 9, 2020 (KR) .................. 10-2020-0084989
Jul. 9, 2021 (KR) .................. 10-2021-0090090

(51) Int. Cl.
*B60J 5/04* (2006.01)
*B60J 1/20* (2006.01)

(52) U.S. Cl.
CPC .......... *B60J 5/0494* (2013.01); *B60J 1/2086* (2013.01); *B60Y 2304/07* (2013.01)

(58) Field of Classification Search
USPC .................. 296/146.2, 146.3, 208, 97.1
See application file for complete search history.

(56) References Cited

U.S. PATENT DOCUMENTS

| | | | | |
|---|---|---|---|---|
| 4,047,751 | A * | 9/1977 | Koike | B60J 10/79 296/93 |
| 5,251,953 | A * | 10/1993 | Willey | B60J 1/2002 454/131 |
| 5,527,583 | A * | 6/1996 | Nozaki | B60J 10/35 428/31 |
| 5,797,645 | A * | 8/1998 | Schenk | B60J 1/2002 454/132 |
| 8,360,500 | B2 * | 1/2013 | Mishimagi | B60J 1/20 296/97.1 |

FOREIGN PATENT DOCUMENTS

GB       2074639    * 11/1981
KR  10-2074225 B1     2/2020

* cited by examiner

*Primary Examiner* — Joseph D. Pape
(74) *Attorney, Agent, or Firm* — Paratus Law Group, PLLC

(57) ABSTRACT

Disclosed is door visor mounted on a vehicle having a door without an upper frame, the door visor including a body portion which includes: a molding portion mounted on a vehicle body of the vehicle; and a visor portion connected to the molding portion and covering a portion of an upper portion of a door window in a state of being spaced apart from the door window based on a state where the door of the vehicle is closed and the door window of the door is closed.

6 Claims, 9 Drawing Sheets

FIG. 11

DOOR VISOR

CROSS-REFERENCE TO PRIOR APPLICATIONS

This application is a National Stage Patent Application of PCT International Patent Application No. PCT/KR2021/008795 (filed on Jul. 9, 2021) under 35 U.S.C. § 371, which claims priority to Korean Patent Application Nos. 10-2020-0084989 (filed on Jul. 9, 2020) and 10-2021-0090090 (filed on Jul. 9, 2021), which are all hereby incorporated by reference in their entirety.

BACKGROUND

The present disclosure generally relates to a door visor, and more particularly, to a door visor provided on a vehicle body.

A door visor is a member that is attached to the upper window frame of a vehicle window and blocks sunlight to protect eyes of a driver. In addition, the door visor performs a function of preventing rainwater from flowing into a vehicle even when a window is partially opened when it rains while the vehicle travels.

As a related art related to a door visor, there is a Korean Patent Registration No. KR 10-2074225 entitled "window visor for an automatic expansion type vehicle". The related art is a technology in which a visor body member is coupled to a door frame, and there is a problem in that it is difficult to apply a door visor to a window of a vehicle without an upper window frame in a vehicle window.

SUMMARY

The present disclosure is made to solve problems of the related art, and relates to a door visor that can be mounted on a vehicle body so as to be applicable to a door of a vehicle without a door upper frame.

In one embodiment, a technology is disclosed regarding a door visor mounted on a vehicle having a door without an upper frame. The door visor includes a body portion. The body portion includes a molding portion mounted on a vehicle body of the vehicle, and a visor portion connected to the molding portion and covering a portion of an upper portion of a door window in a state of being spaced apart from the door window based on a state where the door of the vehicle is closed and the door window of the door is closed.

The body portion may further include a protrusion provided between the molding portion and the visor portion.

The door visor may further include an adhesive portion attaching the molding portion to the vehicle body. The molding portion may include a depression. The adhesive portion may be provided in the depression or may be provided to both the depression and a periphery of the depression.

The door visor may further include an adhesive portion attaching the molding portion to the vehicle body. The molding portion may include a plurality of depressions having different depths. The adhesive portion may be provided in any one selected from among the plurality of depressions or may be provided to adjacent depressions among the plurality of depressions.

The door visor may further include an adhesive portion attaching the molding portion to the vehicle body. The adhesive portion may include at least one perforated line to be parallel in a longitudinal direction. The adhesive portion may be provided to have an uneven thickness in a width direction.

Meanwhile, a maximum width of the visor portion covering a portion of the upper portion of the door window may be set to be shorter than a reference height. The reference height may be calculated based on a descending height of the door window which descends by a predetermined height when the door of the vehicle is closed and the door is opened in a state where the door window is closed.

Meanwhile, a maximum width of the visor portion covering a portion of the upper portion of the door window may be shorter than a height at which an upper end of the door window descends for a minimum time. When the door of the vehicle is closed and the door is opened in a state where the door window is closed, the door window may descend at a predetermined speed. The minimum time may be calculated by a distance between the door window and the visor portion calculated for each position in the longitudinal direction of the visor portion covering the door window, and by a movement speed for each position of the door window corresponding to each position in the longitudinal direction of the visor portion covering the door window according to the opening of the door.

According to the present disclosure, a maximum width of a visor portion covering a portion of an upper portion of a door window at a predetermined gap is determined and a door visor is designed in consideration of an operation of the door window of a door of a vehicle to which the door visor is applied, and thus, in a case where the door visor is installed on the vehicle body, the door window of the door is not caught by the door visor when the door is opened.

In addition, according to the present disclosure, a protrusion is provided between a molding portion and a visor portion. Accordingly, it is possible to adjust a gap, an angle, or the like between the door window and the visor portion by adjusting a position of the protrusion coming into contact with the vehicle body when the door visor is attached to the vehicle body.

In addition, according to the present disclosure, a depression is provided in the molding portion, and the adhesive portion is provided in the depression or provided to both the depression and a periphery of the depression, and thus, the molding portion may be attached to the vehicle body through the provided adhesive portion. Accordingly, it is possible to adjust the gap between the vehicle body and the molding portion, and thus, adjust the gap, angle, or the like between the door window and the visor portion.

In addition, according to the present disclosure, a plurality of depressions having different depths are provided in the molding portion, the adhesive portion is provided in any one selected from the plurality of depressions and provided to adjacent depressions, and the molding portion may be attached to the vehicle body through the provided adhesive portion. Accordingly, it is possible to adjust the gap between the vehicle body and the molding portion, and thus, adjust the gap, angle, or the like between the door window and the visor portion.

In addition, according to the present disclosure, the adhesive portion includes at least one perforated line provided to be parallel in a longitudinal direction, and the adhesive portion is provided to have an uneven thickness in a width direction. Therefore, when the molding portion is attached to the vehicle body through the adhesive portion, the adhesive portions having different thicknesses can be selected by the perforated line, and thus, it is possible to adjust the gap, angle, or the like between the door window and the visor portion.

The foregoing provides only optional concepts in a simplified form for matters to be described in more detail later. It is not intended to limit key features or essential features of the claims, or to limit the scope of the claims.

DETAILED DESCRIPTION

Hereinafter, embodiments disclosed in the present disclosure will be described in detail with reference to the drawings. Unless otherwise specified in the present disclosure, similar reference numbers in the drawings indicate similar elements. Exemplary embodiments described above in the detailed description, drawings, and claims are not intended to be limiting, other embodiments may be used, and other changes may be made without departing from the spirit or scope of the technology disclosed herein. A person skilled in the art may arrange, construct, combine, and design the components of the present disclosure, that is, the components generally described herein and illustrated in the drawings, in variously different configurations, and may readily understand that all of these are explicitly contemplated and form a portion of the present disclosure. In the drawings, in order to clearly express various layers (or films), regions, and shapes, the width, length, thickness, or shape of the components may be exaggerated.

When one component is referred to as "provided" in another component, a case in which the one component is directly provided to the other component, as well as a case in which an additional component is interposed therebetween may be included.

When a component is referred to as "connected" to another component, a case in which the component is directly connected to the other component as well as a case in which an additional component is interposed between them may be included.

When a component is referred to as "being mounted" to another component, a case in which the component is directly mounted to the other component, as well as a case in which an additional component is interposed between them, may be included.

Since descriptions of the disclosed technology is only an embodiment for structural or functional description, the scope of the disclosed technology should not be construed as being limited by the embodiment described in the present disclosure. That is, since the embodiment may have various changes and may have various forms, it should be understood that the scope of the disclosed technology includes equivalents capable of realizing the technical idea.

A singular expression is to be understood as including a plural expression unless the context clearly dictates otherwise, and it should be understood that terms such as "comprise" or "have" are intended to designate the presence of an embodied feature, number, step, action, component, part, or combination thereof, and do not preclude the possibility of addition or existence of one or more other features or numbers, steps, operations, components, parts, or combinations thereof in advance.

All terms used herein have the same meaning as commonly understood by one of ordinary skill in the art to which the disclosed technology belongs, unless defined otherwise. Terms defined in commonly used dictionaries should be interpreted as being consistent with the meanings in the context of the related art, and cannot be interpreted as having ideal or excessively formal meanings unless explicitly defined in the present application.

Figure 1:
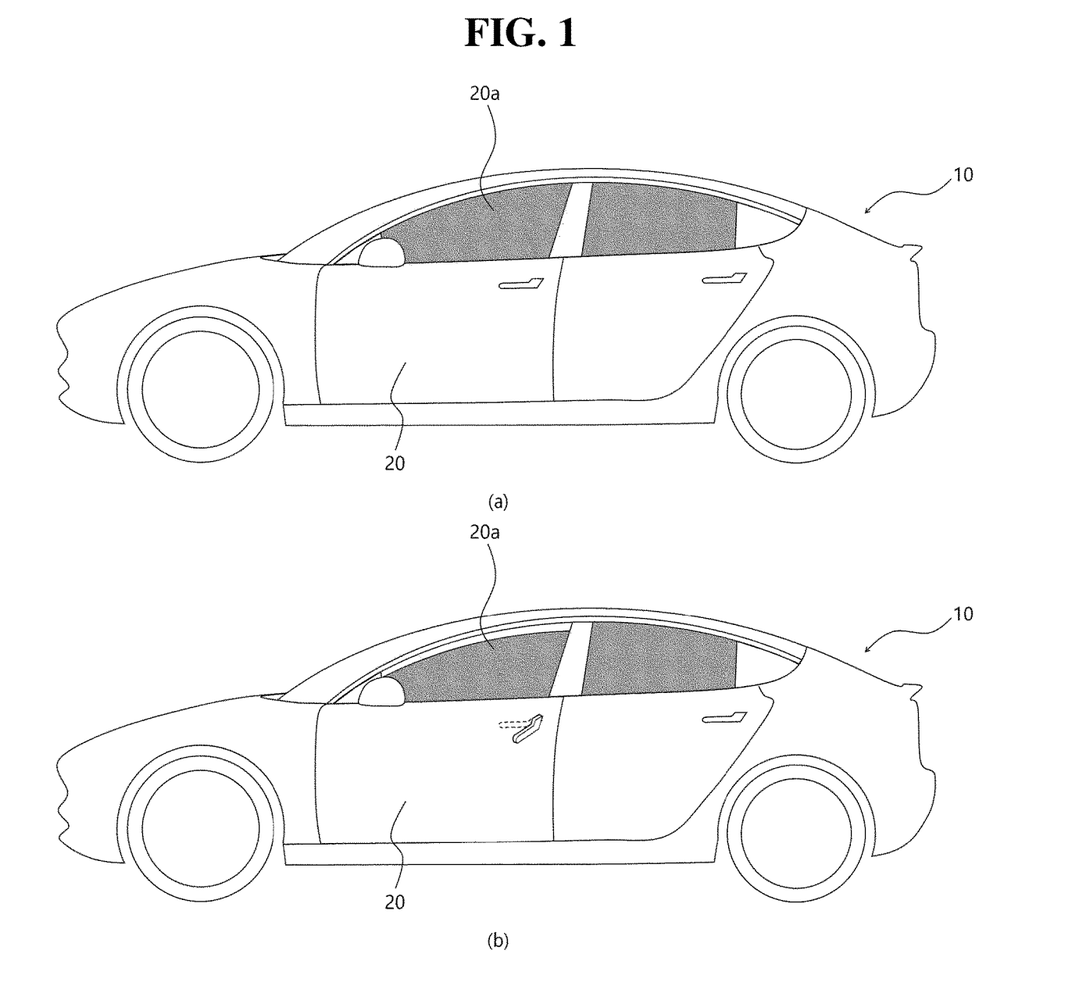
FIG. 1 is a view showing a vehicle equipped with a door without an upper frame.
Figure 2:
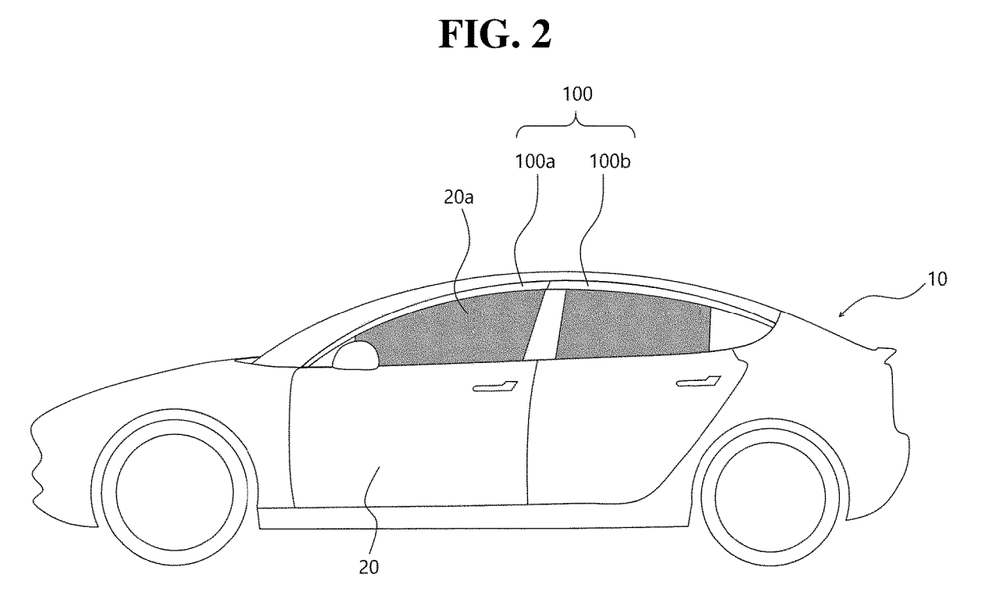
FIG. 2 is a view showing a state in which a door visor disclosed in the present disclosure is mounted on a vehicle body in a vehicle equipped with a door without an upper frame.
Figure 3:
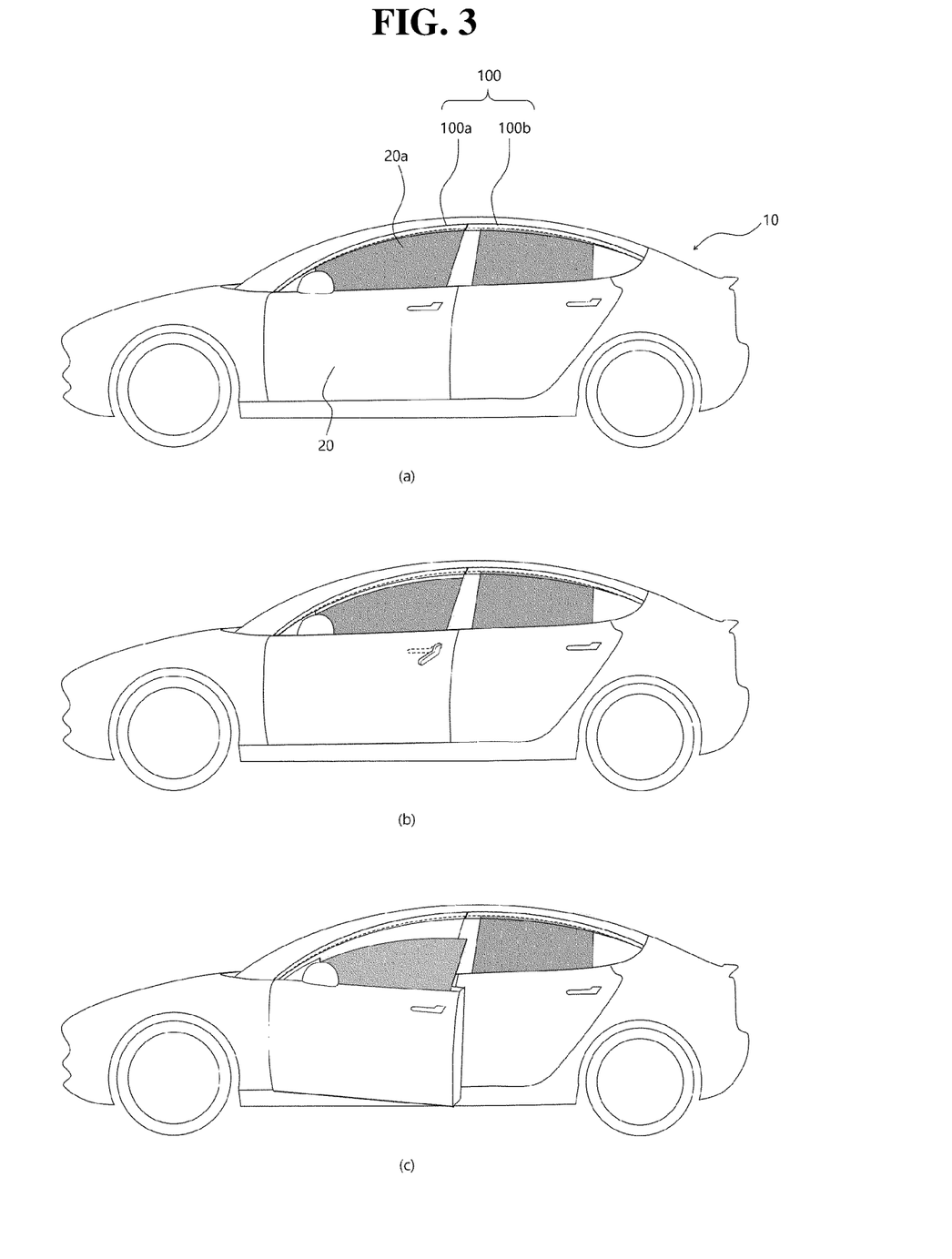
FIG. 3 is a view showing a door opening state of a vehicle equipped with a door visor disclosed in the present disclosure in which a maximum width of a visor portion is determined in consideration of an operation of a door window.
Figure 4:
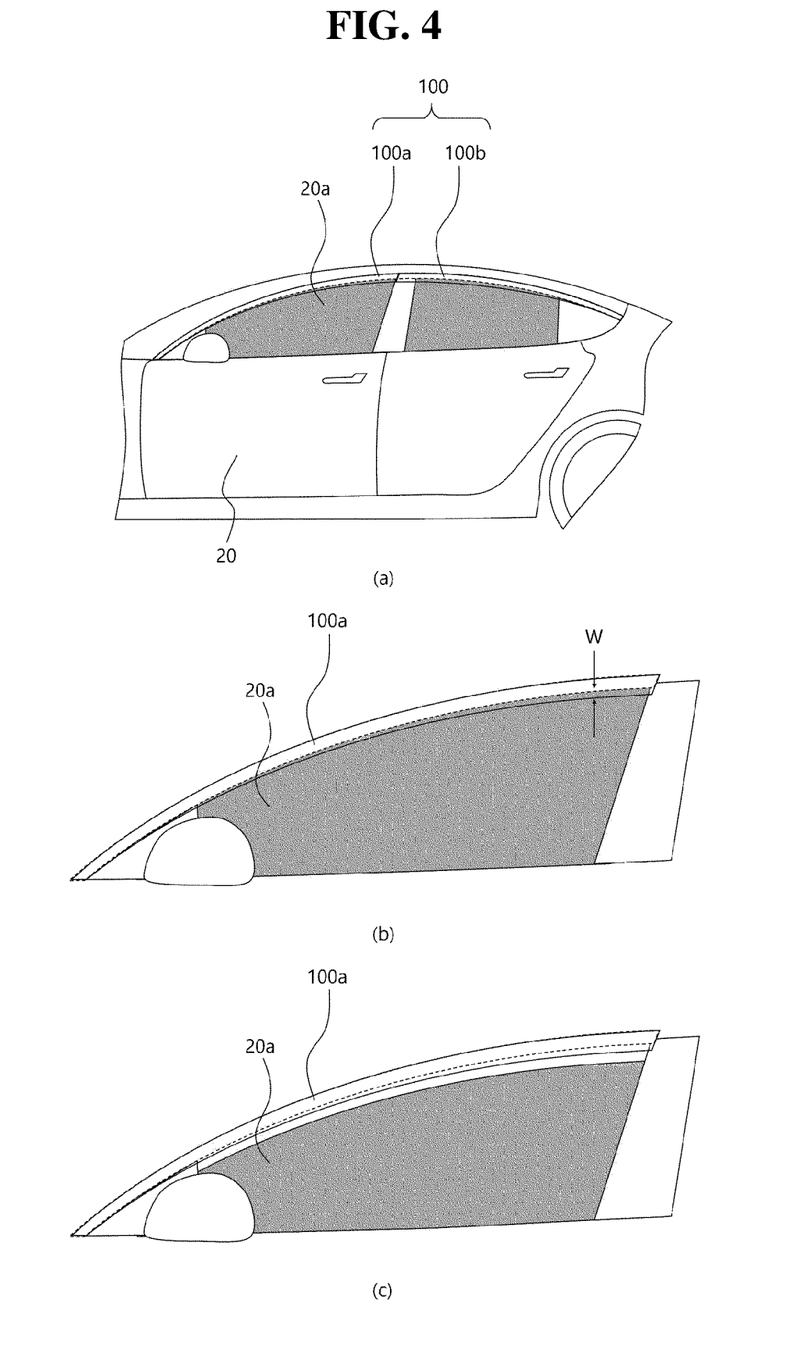
FIG. 4 is a view for describing the door visor disclosed in the present disclosure in which the maximum width of the visor portion is determined in consideration of the operation of the door window.
Figure 5:
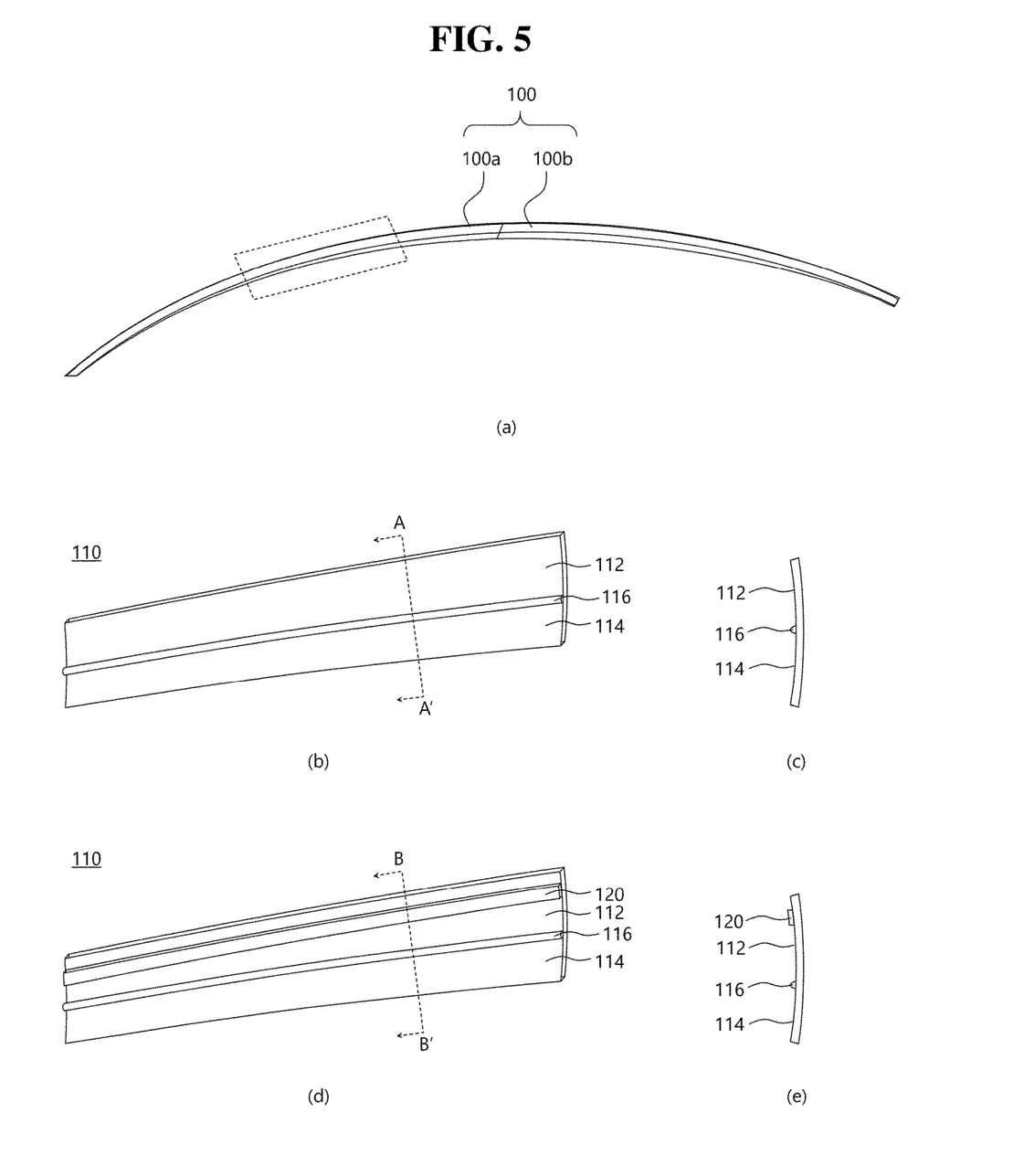
FIG. 5 is a view showing a state of the door visor in the present disclosure.
Figure 6:
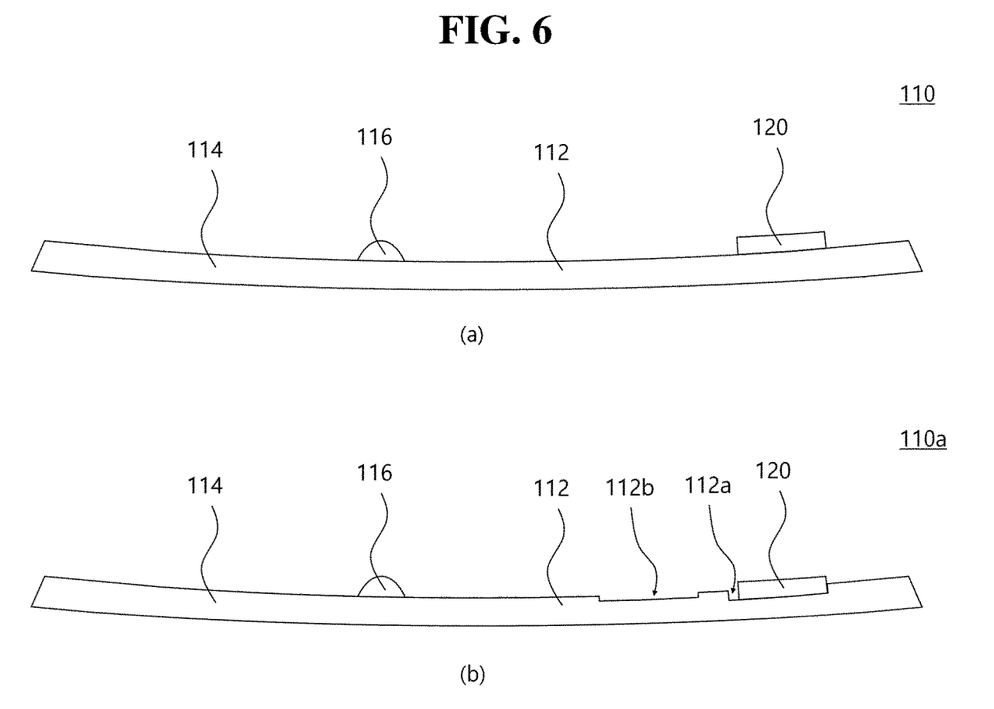
FIG. 6 is a view showing examples of a body portion disclosed in the present disclosure.
Figure 7:
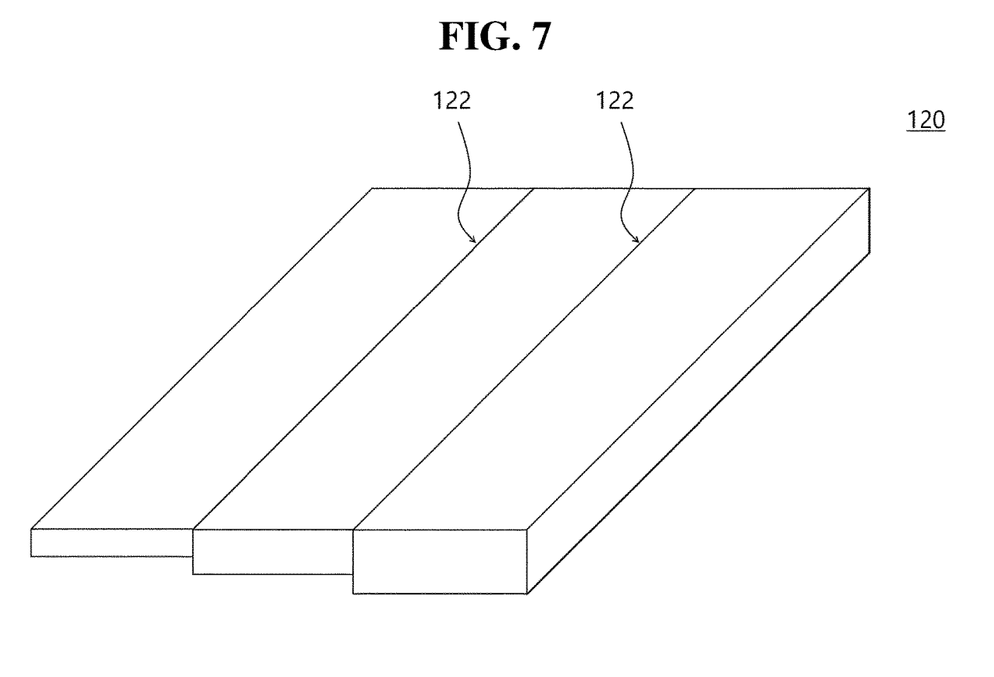
FIG. 7 is a view showing a modification example of an adhesive portion disclosed in the present disclosure.
Figure 8:
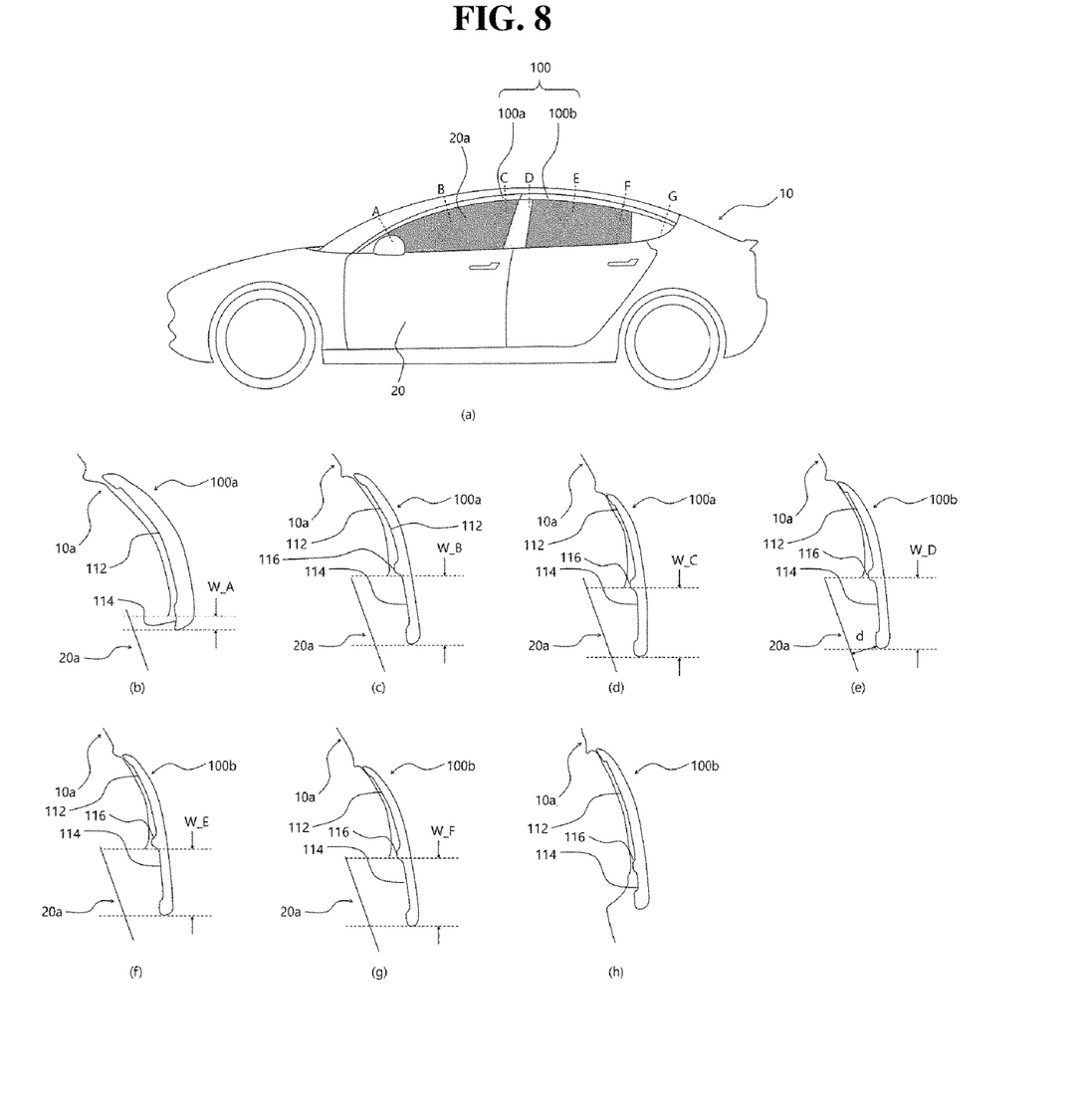
FIG. 8 is a view showing a state in which the door visor mounted on the vehicle body disclosed in the present disclosure is provided on a front door vehicle body and a rear door vehicle body, and a length at which the visor portion covers the door window at a predetermined distance at positions A to G.
Figure 9:
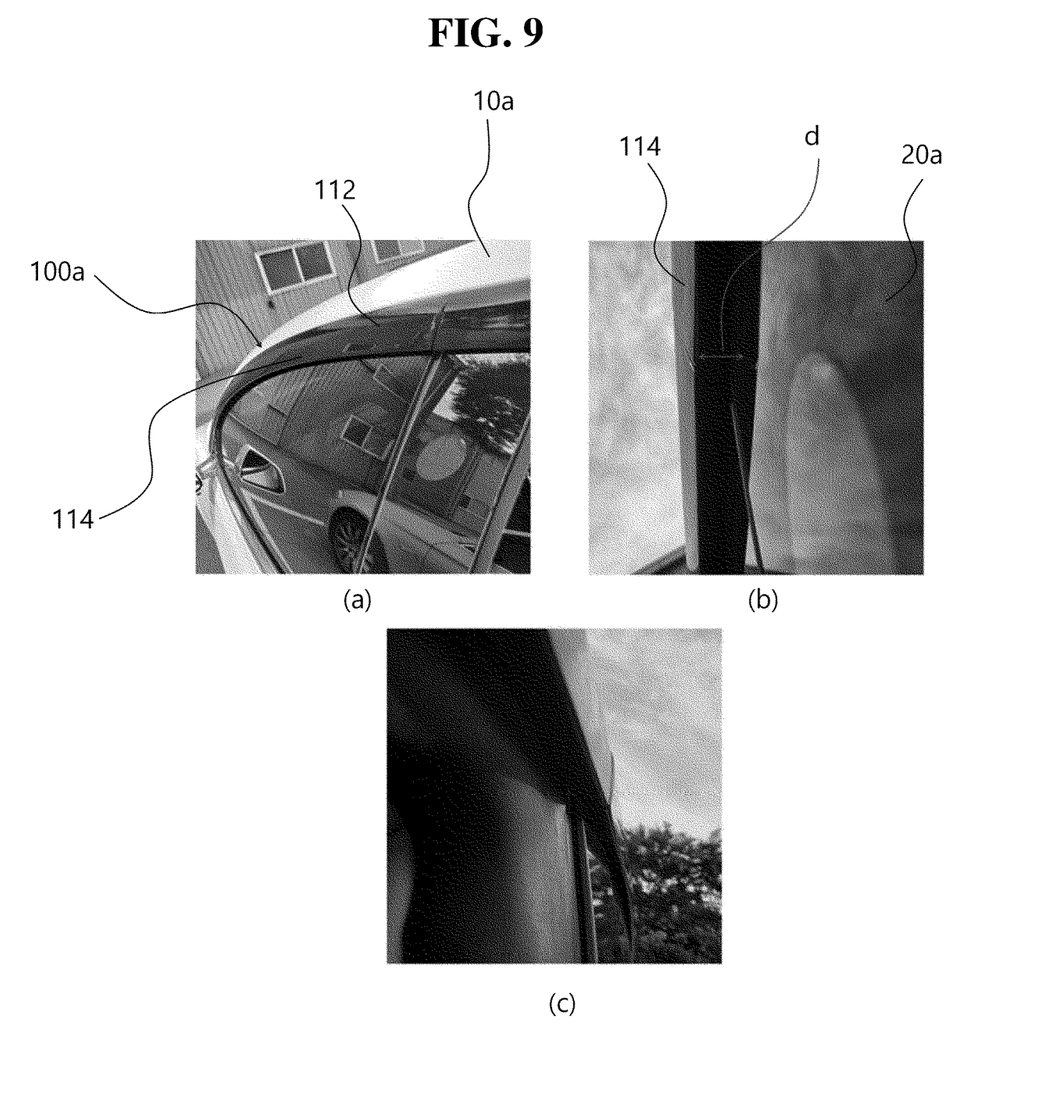
FIG. 9 is a view showing a state of the door visor disclosed in the present disclosure actually mounted on a Tesla Model 3.
Figure 10:
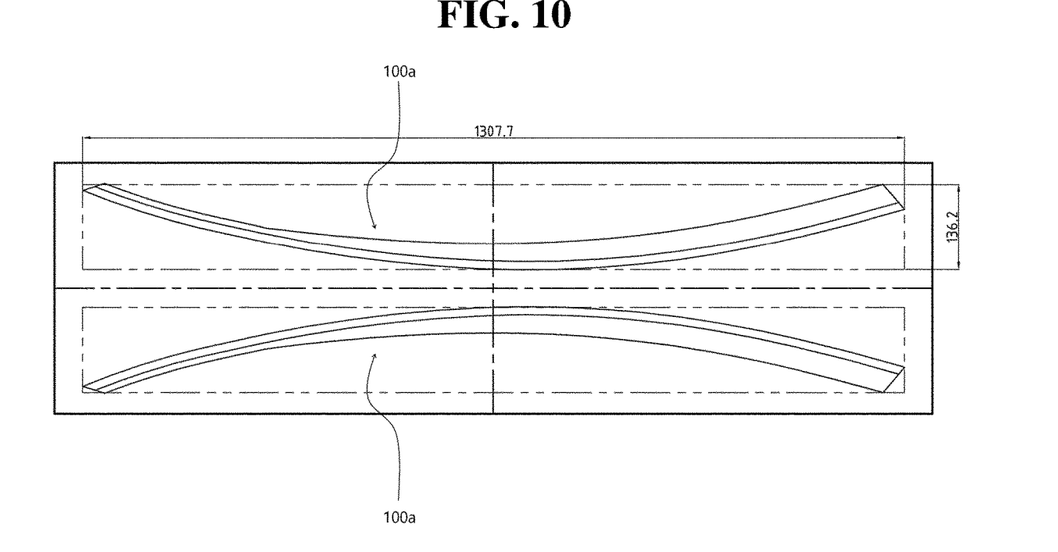
FIGS. 10 and 11 are diagrams showing actual design dimensions of door visors provided on a vehicle body corresponding to a front door of the Tesla Model 3 and a vehicle body corresponding to a rear door.
Figure 11:
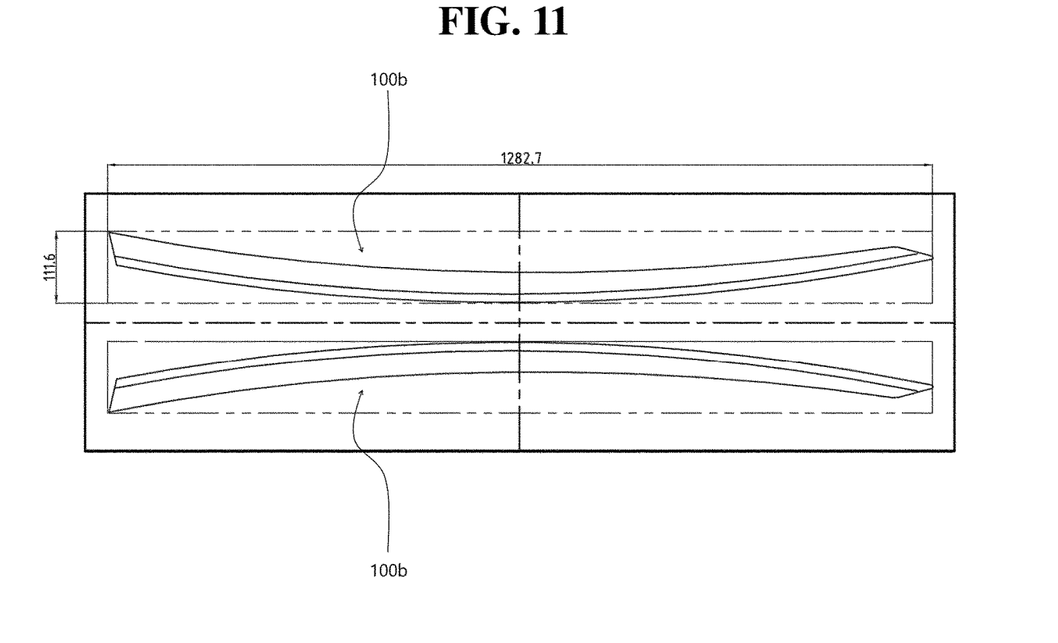

FIG. 1 is a view showing a vehicle equipped with a door without an upper frame. FIG. 1(a) is a view showing a state before the door is opened and FIG. 1(b) is a view showing a state where a door window descends according to the operation of a door handle. FIG. 2 is a view showing a state in which a door visor disclosed in the present disclosure is mounted on a body of a vehicle in which the door without the upper frame is mounted. FIG. 3 is a view showing a door opening state of the vehicle equipped with the door visor disclosed in the present disclosure in which a maximum width of a visor portion is determined in consideration of the operation of the door window. FIG. 3(a) is a view showing a state in which the door visor disclosed in the present disclosure is mounted on the body of the vehicle in which the door without the upper frame is mounted. FIG. 3(b) is a view showing a state in which the door window descends according to the operation of the door handle. FIG. 3(c) is a view showing a state in which the door of the vehicle equipped with the door visor disclosed in the present disclosure, in which the maximum width of the visor portion is determined in consideration of the operation of the door window, is stably opened. FIG. 4 is a view for describing the door visor disclosed in the present disclosure in which the maximum width of the visor portion is determined in consideration of the operation of the door window. FIG. 4(a) is a view showing a state in which the door visor disclosed in the present disclosure is mounted on the body of the vehicle in which the door without the upper frame is mounted. FIG. 4(b) is a view showing a state in which the visor portion of the door visor of the present disclosure mounted in a spaced apart state from the door window based on the closed state of the door window covers a portion of the upper portion of the door window, in a state where the door is closed. FIG. 4(c) is a view showing a state in which a height of the door window descends according to the operation of the door handle or the opening of the door. FIG. 5 is a view showing a state of the door visor in the present disclosure. FIG. 5(a) is a view showing an appearance of a rear portion of the door visor disclosed in the present disclosure mounted on the front and rear of the vehicle body. FIG. 5(b) is a view showing a portion indicated by a dotted line in FIG. 5(a) of the rear portion of the door visor. FIG. 5(c) is a view showing a state viewed in an AA' direction of FIG. 5(b). FIG. 5(d) is a view showing a state in which an adhesive tape is provided as an example of an adhesive portion in a molding portion. FIG. 5€ is a view showing a state viewed in a BB' direction of FIG. 5(d). FIG. 6 is a view showing examples of the body portion disclosed in the present disclosure. FIG. 6(a) is a view showing a body portion including the molding portion is not provided with depressions and FIG. 6(b) is a view showing a body portion including the molding portion provided with a plurality of depressions. FIG. 7 is a view showing a modification example of the adhesive portion disclosed in the present disclosure. FIG. 8 is a view showing a state in which the door visor mounted on the vehicle body disclosed in the present disclosure is provided on a front door vehicle body and a rear door vehicle body, and a length at which the visor portion covers the door window at a predetermined distance at positions A to G. FIG. 8(a) is a view showing a state in which a door visor disclosed in the present disclosure is provided on the front door body and the rear door body, according to an embodiment. FIGS. 8(b) to 8(h) are views showing a height or length covering the door window in a state where the visor portion is spaced apart from the door window by a predetermined distance at positions A to G shown in FIG. 8(a). W_A, W_B, W_C, W_D, W_E and W_F indicated in FIGS. 8(b) to 8(h) may be, for example, about 3 mm, about 15.8 mm, about 17.5 mm, about 17.5 mm, about 17.2 mm and about 16.8 mm, respectively. In the case of FIG. 8(g), the visor portion covers a window fixed to the vehicle body adjacent to the rear door, not the door window, at a predetermined distance, and a covering height or length may be, for example, about 8 mm. d of FIG. 8(d) is a distance between the door window and the visor portion of the door visor, and may be, for example, about 6.5584 mm. These covering heights or lengths, d, are actual design values of the door visor disclosed in this specification designed for the Tesla Model 3. FIG. 9 is a view showing the appearance of the door visor disclosed in the present disclosure actually mounted on the Tesla Model 3. FIGS. 10 and 11 are views showing actual design dimensions of a door visor provided on a vehicle body corresponding to a front door of a Tesla Model 3 and a vehicle body corresponding to a rear door, respectively. The units of the numerical values shown in FIGS. 10 and 11 are mm. Referring to the lower drawings of FIGS. 10 and 11, a central portion is a protrusion, and an upper portion corresponds to a molding portion and a lower portion corresponds to a visor portion with respect to the center. The drawings shown in the upper and lower portions of FIG. 10 are views showing actual design dimensions of a vehicle body corresponding to the left front door of the Tesla Model 3 and a door visor corresponding to the right front door, respectively, when viewed from the front of the vehicle. The drawings shown in the upper and lower portions of FIG. 11 are views showing actual design dimensions of a vehicle body corresponding to the left rear door of the Tesla Model 3 and a door visor corresponding to the right rear door, respectively, when viewed from the front of the vehicle.

Hereinafter, a door visor 100 mounted on a vehicle equipped with a door without an upper frame disclosed in the present disclosure will be described with reference to the drawings. The door visor 100 of the present disclosure can provide an effect of solving the problem that a door window 20a collides with the visor when the door 20 is opened even when the door visor is provided on a vehicle body 10a.

Referring to the drawings, the door visor 100 includes a body portion 110. In some other embodiments, the door visor 100 may optionally further include an adhesive portion 120. The door visor 100 may be divided into a door visor 100a mounted on a front door body and a door visor 100b mounted on a rear door body. The shapes of the door visor 100a mounted on the front door body and the door visor 100b mounted on the rear door body may vary depending on the shape of the front door and the rear door, but the technical configuration disclosed in the present disclosure may be applied substantially the same. Hereinafter, for convenience of description, both the door visor 100a mounted on the front door body and the door visor 100b mounted on the rear door body will be referred to as the door visor 100.

The body portion 110 includes a molding portion 112 and a visor portion 114. The body 110 may optionally further include a protrusion 116.

The molding portion 112 is mounted on the vehicle body 10a of the vehicle 10. That is, the door visor 100 of the present disclosure is mounted on the vehicle body 10a of the vehicle 10 through the molding portion 112. Since the door visor 100 of the present disclosure is applied to a door without an upper frame, the door visor 100 of the present disclosure is mounted on the vehicle body 10a of the vehicle 10 rather than the door 20.

The visor portion 114 is connected to the molding portion 112, and covers a portion of an upper portion of a door window 20a in a state of being spaced apart from the door window 20a based on a state in which the door 20 of the vehicle 10 is closed and the door window 20a of the door 20 is closed. More specifically, the visor portion 114 is provided to cover the door window 20a in a state of being spaced apart from the door window 20a by a predetermined distance from a top to a bottom of the door window 20a. Accordingly, the door visor 100 of the present disclosure can protect eyes of a driver by blocking sunlight, and prevent rainwater from flowing into the vehicle 10 even in a case where the door window 20a is partially opened when it rains while the vehicle 10 travels.

The protrusion 116 may be provided between the molding portion 112 and the visor portion 114. The protrusion 116 may be provided to protrude in a direction of the vehicle body 10a from a surface facing the door visor 100 facing the vehicle body 10a. In the door visor 100 of the present disclosure, when the molding portion 112 to the vehicle body 10a of the vehicle 10, the protrusion 116 is in close contact with an outer surface of the vehicle body 10a. By adjusting a height of the protrusion 116 protruding from the body 110 and a position of the protrusion 116 in close contact with the vehicle body 10a, a gap between the door window 20a and the visor portion 114 covering a portion of the upper portion of the door window 20a, an angle between the door window 20a and the visor portion 114 covering a portion of the upper portion of the door window 20a, and a width between the door window 20a and the visor portion 114 covering a portion of the upper portion of the door window 20a can be adjusted. Accordingly, the protrusion 116 may prevent the door window 20a and the visor 114 from colliding with each other when the door 20 is opened.

In a case where there is no protrusion 116, when the molding portion 112 is attached to the vehicle body 10a, the visor portion 114 may be bent along the outer surface of the vehicle body 10a. In this case, a case may occur in which an end of the visor portion 114 faces the door window 20a of the door 20. In this case, when water applied from the outside of the vehicle through rain or the like flows through the door visor 100, the water reaching the visor portion 114 flows along a curved surface of the visor portion 114 and flows into the door window 20a of the door 20, and thus, there may be a problem in that an interior of the vehicle is contaminated. This problem is solved by providing the above-described protrusion 116 between the molding portion 112 and the visor portion 114, and adjusting any one of a degree of protrusion of the protrusion 116, a position at which the protrusion 116 is in close contact with the vehicle body 10a, and a combination thereof to adjust the angle and the gap between the visor portion 114 and the door window 20a and the width of the visor portion 114 covering the upper portion of the door window 20a.

The adhesive portion 120 allows the molding portion 112 to be mounted on the vehicle body 10a. As the adhesive portion 120, a band-shaped adhesive tape may be used as an example, but as long as the molding portion 112 can be mounted on the vehicle body 10a, the shape and type of the adhesive portion 120 are not limited.

For example, the molding portion 112 may include depressions 112a and 112b. The adhesive portion 120 may be provided in the depressions 112a and 112b or may be provided to overlap the depressions 112a and 112b and the periphery of the depressions 112a and 112b. In the drawing, two depressions 112a and 112b are exemplified, but one may be used. In this way, the depressions 112a and 112b are provided in the molding portion 112. Accordingly, when the molding portion 112 is attached to the vehicle body 10a of the vehicle 10 through the same adhesive portion 120, the adhesive portion 120 is located at the depression 112a or 112b, located at the periphery of the depression 112a or 112b, or located to overlap the depression 112a or 112b or the periphery of the depression 112a or 112b, and thus, the gap between the vehicle body 10a and the molding portion 112 can be adjusted. Through this, the gap between the visor portion 114 covering a portion of the upper portion of the door window 20a and a portion of the upper portion of the door window 20a can be adjusted.

As another example, the molding portion 112 may include a plurality of depressions 112a and 112b having different depths. The adhesive portion 120 may be provided in any one selected from among the plurality of depressions 112a and 112b or may be provided to overlap adjacent depressions among the plurality of depressions 112a and 112b. In the drawing, the adhesive portion 120 provided in the depression 112a, which is any one selected from among the plurality of depressions 112a and 112b, is shown as an example. In this way, the depressions 112a and 112b having different depths are provided in the molding portion 112. Accordingly, when the molding portion 112 is attached to the vehicle body 10a of the vehicle 10 through the same adhesive portion 120, the adhesive portion 120 is located at the depression 112a or 112b, located at the periphery of the depression 112a or 112b, or located to overlap the depression 112a or 112b or the periphery of the depression 112a or 112b, and thus, the gap between the vehicle body 10a and the molding portion 112 can be adjusted. Through this, the gap between the visor portion 114 covering a portion of the upper portion of the door window 20a and a portion of the upper portion of the door window 20a can be adjusted.

The molding portion 112 including the depressions 112a and 112b and the adhesive portion 120 may be linked to the above-described protrusion 116, and through this, it is possible to adjust the gap between the door window 20a and the visor portion 114 covering a portion of the upper portion of the door window 20a, the angle between the door window 20a and the visor portion 114 covering a portion of the upper portion of the door window 20a, and the width between the door window 20a and the visor portion 114 covering a portion of the upper portion of the door window 20a. Accordingly, it is possible to prevent the molding portion 112 including the depressions 112a and 112b and the adhesive portion 120 from colliding with the door window 20a and the visor portion 114 when the door 20 is opened.

As another example, as shown in FIG. 7, the adhesive portion 120 may include at least one or more perforated lines 122 provided in parallel with a longitudinal direction. The adhesive portion 120 may be provided so that a thickness thereof is not uniform in a width direction. At least one perforation line 122 provided in the adhesive portion 120 in parallel with the longitudinal direction of the adhesive portion 120 and the thickness of the adhesive portion 120 is not uniform based on the width direction of the adhesive portion 120. Accordingly, the adhesive portion 120 of different thickness can be selected through the perforated line 122, and thus, the gap between the visor portion 114 covering a portion of the upper portion of the door window 20a and the portion of the upper portion of the door window 20a can be adjusted. In addition, since the adhesive portions 120 of different thicknesses can be simultaneously selected through the perforated line 122, as well as the gap between the visor portion 114 covering a portion of the upper portion of the door window 20a and the portion of the upper portion of the door window 20a, the angle therebetween can be adjusted. Accordingly, the molding portion 112 including the depressions 112a and 112b and the adhesive portion 120 can prevent the door window 20a and the visor portion 114 from colliding with each other when the door 20 is opened.

Meanwhile, a maximum width of the visor portion 114 covering a portion of the upper portion of the door window 20a may be provided to be shorter than a reference height. The reference height is calculated based on the descending height of the door window 20a, which descends by a predetermined height when the door 20 of the vehicle 10 is closed and the door 20 is opened in the state where the door window 20a is closed. Since a plane of the visor portion 114 and a plane of the door window 20a may be different from each other, the reference height calculated based on the maximum width of the visor portion 14 and the descending height of the door window 20a may be calculated based on the same virtual plane, that is, a value projected on the same virtual plane.

When the door window 20a mounted on the door 20 without an upper frame is closed, it is inserted into a groove provided in the vehicle body 10a positioned above the door window 20a or a groove such as a rubber attached to the vehicle body 10a. Hereinafter, when the door window 20a is closed, a groove provided in the vehicle body 10a into which the upper portion including the end of the door window is inserted or a groove such as a rubber attached to the vehicle body 10a will be referred to as a door window fitting portion. When the door handle is operated to open the door 20 without an upper frame, the door window 20a descends by a predetermined distance from the door window fitting portion, and thus the user can open the door 20.

That is, in the door visor 100 of the present disclosure, the width of the visor portion 114 covering a portion of the upper portion of the door window 20a is determined to be shorter than a maximum descending height of the door window 20a according to the opening of the door 20 in consideration of the descending of the door window 20a when the door 20 is opened, and thus, when the door 20 is opened, it is possible to prevent the door window 20a from colliding with the visor portion 114.

Meanwhile, the maximum width of the visor portion 114 covering a portion of the upper portion of the door window 20a may be shorter than the height at which the upper end of the door window 20a descends for a minimum time. When the door 20 of the vehicle 10 is closed and the door 20 is opened in a state where the door window 20a is closed, the door window 20a descends at a predetermined speed. The minimum time may be calculated by the distance between the door window 20a and the visor portion 114 calculated for each position in the longitudinal direction of the visor portion 114 covering the door window 20a, and by a movement speed for each position of the door window 20a corresponding to each position in the longitudinal direction of the visor portion 114 covering the door window 20a according to the opening of the door 20. Since the plane of the visor portion 114 and the plane of the door window 20a may be different from each other, the reference height calculated based on the maximum width of the visor portion 14 and the height when the upper end of the door window 20a descends during the minimum time may be calculated based on the same virtual plane, that is, a value projected on the same virtual plane.

That is, the door visor 100 of the present disclosure calculates the maximum width of the visor portion 114 covering a portion of the upper portion of the door window 20a in consideration of the door window 20a descending at a predetermined speed for a predetermined time when the door 20 is opened. From the distance between the door window 20a and the visor portion 114 according to the position in the longitudinal direction of the visor portion 114 covering the door window 20a, and the maximum opening speed of the door window 20a corresponding to the position in the longitudinal direction of the visor portion 114 covering the door window 20a, it is possible to calculate an arrival time at which the upper end of the door window 20a corresponding to the position in the longitudinal direction of the visor portion 114 covering the door window 20a reaches the lower end of the visor portion 114, and it is possible to calculate the minimum arrival time from the calculated arrival time. By setting the maximum width of the visor portion 114 covering a portion of the upper portion of the door window 20a to be shorter than the height at which the door window 20a descends during the calculated minimum arrival time, it is possible to prevent the door window 20a from colliding with the visor portion 114 when the door 20 is opened.

Hereinafter, a detailed design process for determining the width of the visor portion 114 that covers a portion of the upper portion of the door window 20a will be described.

When the door 20 is closed in the case of the vehicle 10 equipped with the door 20 to which the door visor 100 of the present disclosure is applied, in order to isolate the inside of the vehicle 10 from the outside thereof, the end of the door window 20a is fitted into or in close contact with a groove provided on the vehicle body or a groove such as rubber attached to the vehicle body. That is, the end of the door window (20a) is fitted or closely attached to the door window fitting portion.

Therefore, in a case where the door 20 is opened, when the door window 20a of the door 20 remains as it is, the door 20 cannot be opened or is difficult to open. Accordingly, when an occupant opens the door 20 by operating the external or internal door handle when the occupant gets on or off from the vehicle 10, the door window 20a of the door 20 descends by a predetermined height or distance during the operation of the door handle. Therefore, the door window 20a of the door 20 can be opened without being caught in the vehicle body 10a. Hereinafter, the outer or inner door handle will be referred to as a door handle.

Meanwhile, in a case where the door visor 100 is installed in the vehicle body 10a, when the door 20 is opened, the door window 20a of the door 20 is caught by the visor portion 114 of the door visor 100. This problem can be solved by setting the range of the length in which the visor portion 114 protrudes in the direction of the door window 20a of the door 20, as described below.

For example, the width of the visor portion 114 covering the upper portion of the door window 20a may be shorter than the height at which the uppermost portion of the door window 20a of the door 20 descends from the door window fitting portion when the door handle is operated. In other words, the height of the width of the visor portion 114 covering the upper portion of the door window 20a may have a length equal to or shorter than a length descending by a predetermined distance from the uppermost portion of the door window 20a of the door 20 from the end of the door window fitting portion when the door handle is operated. Accordingly, in a case where the door visor 100 of the present disclosure is installed in the vehicle body 10a, when the door 20 is opened, it is possible to prevent the door window 20a of the door 20 from being caught by the visor portion 114 of the door visor 100.

As another example, a case is considered, in which the door window 20a of the door 20 descends in one step when the door 20 is opened through the door handle. One operation of the door window 20a of the door 20 according to the door handle operation is defined as an operation in which the door window 20a of the door 20 descends by a predetermined distance at a speed v1 for a time t1 during and after the operation of the door handle or in the process of opening the door 20 after the operation of the door handle.

In this case, a distance or gap between the door window 20a and the visor portion 114 covering at least portion of the door window 20a at a predetermined distance, or a distance or gap between the end of the visor portion 114 and the door window 20a of the door 20, or between the end of the visor portion 114 and the upper end of the door window 20a of the door 20 is represented by d. d may be determined when the molding portion 112 is attached to the vehicle body 10a. In addition, d may be adjusted by adjusting at least one selected from the degree of protrusion of the protrusion 116, the position at which the protrusion 116 is in close contact with the vehicle body 10a, and a combination thereof when attaching the molding unit 112 to the vehicle body 10a. Alternatively, d may be adjusted when selecting the adhesive portion 120. D may have the same value for each position in the longitudinal direction of the visor portion 114 covering the door window 20a at a predetermined interval. Alternatively, d may have a different value for each position in the longitudinal direction of the visor portion 114 that covers the door window at a predetermined interval. When the value of d is different for each position of the visor portion 114, d may be determined based on the shortest distance or the shortest gap between the visor portion 114 or the end of the visor portion 114 and the door window 20a of the door 20.

Meanwhile, it is assumed that a maximum speed at which the door 20 can be opened simultaneously with the door handle operation is v4. In this case, the shortest time for the door window 20a of the door 20 to reach the visor portion 114 may be d÷v4.

During d÷v4 time, the height L1 of the uppermost portion of the door window 20a descending from the door fitting portion or the end of the door fitting portion may be expressed as follows.

When d÷v4≤t1, L1=(d÷v4)×v1.
When t1<d÷v4, L1=t1×v1.

In this case, the maximum width of the visor portion 114 may be set to have a length equal to or shorter than L1, which is the height descending from the end of the door window fitting portion or the door window fitting portion of the door window 20a for d÷v4 time. Accordingly, in a case where the door visor 100 is installed in the vehicle body 10a, when the door 20 is opened, it is possible to prevent the door window 20a of the door 20 from being caught by the visor portion 114 of the door visor 100. The above example shows a case in which the door window 20a descends by a predetermined height during the time t1 at a constant velocity v1. When the descending speed of the door window 20a is not at a constant velocity, the descending height L1 of the door window 20a may be obtained by integrating v1, which is the velocity of the door window 20a, with respect to time. Since a person skilled in the art can fully understand this, a detailed description thereof will be omitted for convenience of description.

As another example, a case is considered, in which the door window 20a of the door 20 descends in two steps when the door 20 is opened through the door handle. The two-step descending of the door window 20a of the door 20 may be divided into the following two operations.

The two operations of the door window 20a of the door 20 according to the door handle operation may be divided into a first operation in which the door window 20a of the door 20 descends by a first distance from the door window fitting portion or the end of the door window fitting portion when the door handle is operated, and a second operation in which after the first operation, that is, after the door handle operation or in the process of opening the door 20 after the door handle operation, the door window 20a of the door 20 descends by a first distance and then further descends by a second distance.

In this case, the distance or interval between the visor portion 114 covering the door window 20a or the end of the visor portion 114 and the door window 20a of the door 20 is represented by d. d may be determined in a process of attaching the molding portion 112 to the vehicle body 10a or a process of selecting the adhesive portion 120. In addition, d can be adjusted by adjusting at least one selected from the degree of protrusion of the protrusion 116 in the process of attaching the molding unit 112 to the vehicle body 10a, the position at which the protrusion 116 is in close contact with the vehicle body 10a, and a combination thereof. D may have the same value for each position in the longitudinal direction of the visor portion 114 covering the door window 20a. Alternatively, d may have a different value for each position in the longitudinal direction of the visor portion 114 covering the door window 20a. When the value of d is different for each position of the visor portion 114, d may be determined based on the shortest distance or the shortest gap between the visor portion 114 or the end of the visor portion 114 and the door window 20a of the door 20.

A descending speed of the door window 20a of the door 20 in the first operation during the door handle operation is represented by v2, and a set descending time of the door window 20a of the door 20 in the first operation is presented by t2. In the second operation after the first operation, a descending speed of the door window 20a of the door 20 is presented by v3, and a set descending time of the door window 20a of the door 20 in the second operation is represented by t3.

Meanwhile, it is assumed that the maximum speed at which the door 20 can be opened simultaneously with the door handle operation is v4. In this case, the shortest time for the door window 20a of the door 20 to reach the visor portion 114 may be d÷v4.

During d÷v4 time, a distance L2 from which the uppermost portion of the door window 20a descends from the door window fitting portion or the end of the door window fitting portion may be expressed as follows.

When d÷v4≤t2, L2=(d÷v4)×v2.
When t2<d÷v4≤t2+t3, L2=t2×v2+((d÷v4)−t2)×v3.
When t2+t3<d÷v4, L2=t2×v2+t3×v3.

In this case, the length of the visor portion 114 may be set to have a length equal to or shorter than the descending height L2 from the door window fitting portion or the end of the door window fitting portion of the door window 20a for d÷v4 time. Accordingly, in a case where the door visor 100 is installed in the vehicle body 10a, when the door 20 is opened, it is possible to prevent the door window 20a of the door 20 from being caught by the visor portion 114 of the door visor 100. In the above example, the case is described in which the door window 20a descends by the first distance, which is a predetermined distance, for the time t2 at the constant velocity v2 in the first operation, and further descends by a second distance which is a predetermined distance for a time t3 at a constant velocity v3 in the second operation. When the door window 20a is not at a constant velocity, the descending height L2 of the door window 20a can be obtained by integrating v2 and v3, which are the velocities of the door window 20a, with respect to time. Since a person skilled in the art can fully understand this, a detailed description thereof will be omitted for convenience of description.

FIGS. 8(b) to 8(h) are views showing a height and a length at which the visor portion 114 covers the door window 20a at positions A to G indicated in FIG. 8(a). W_A, W_B, W_C, W_D, W_E and W_F indicated in FIGS. 8(b) to 8(h) may be, for example, about 3 mm, about 15.8 mm, about 17.5 mm, about 17.5 mm, about 17.2 mm and about 16.8 mm, respectively. In the case of FIG. 8(g), the visor portion covers with a window fixed to the vehicle body adjacent to the rear door, not the door window, at a predetermined distance, and the covering height or length may be, for example, about 8 mm. In FIG. 8(e), d is a distance between the door window and the visor portion of the door visor, and may be, for example, about 6.5584 mm. The covering heights, lengths, or d is the actual design values of the door visor disclosed in this specification designed for the Tesla Model 3. FIG. 9 is a view showing a state of the door visor disclosed in the present disclosure actually mounted on a Tesla Model 3.

In the drawing, as the door visor 100 of the present disclosure, the door visor 100 of which the length, width, and overall shape of the door visor 100 are selected so as to be applicable to the upper vehicle body of the side front and rear doors 20 of the Tesla Model 3 is described as an example.

The door window 20a of the Tesla Model 3 is operated through a process corresponding to the case in which the door window 20a descends in two steps.

The length of the width at which the visor portion 114 covers the door window 20a at the positions A to G in FIGS. 8(b) to 8(h) is designed in consideration of the descending speed and descending time of the door window 20a during the first operation and the descending speed and descending time of the door window 20a during the second operation in the Tesla model 3, and the maximum speed at which the door 20 of the Tesla model 3 can be opened.

The door visor 100 shown in FIG. 8 designed in this way is an example of the door visor 100 of the present disclosure, and in a case where the door visor 100 shown in FIG. 8 designed in this way is applied to the Tesla model 3, when the door 20 is opened, it is possible to protect eyes of the driver by blocking sunlight without the door visor 100 being caught by the door window 20a, and in case of rain, even when the window is partially opened, it is possible to rainwater from flowing into the inside of the vehicle.

From the above, various embodiments of the present disclosure are described for purposes of illustration, and it will be understood that various possible modifications exist without departing from the scope and spirit of the present disclosure. Moreover, the various embodiments disclosed above are not intended to limit the spirit of the present disclosure, the true spirit and scope will be presented from the following claims.

What is claimed is:

1. A door visor mounted on a vehicle having a door without an upper frame, the door visor comprising a body portion,
   wherein the body portion includes:
   a molding portion mounted on a vehicle body of the vehicle; and
   a visor portion connected to the molding portion and covering a portion of an upper portion of a door window in a state of being spaced apart from the door window based on a state where the door of the vehicle is closed and the door window of the door is closed;
   wherein a maximum width of the visor portion covering a portion of the upper portion of the door window is shorter than a height at which an upper end of the door window descends for a minimum time,
   wherein, when the door of the vehicle is closed and the door is opened in a state where the door window is closed, the door window descends at a predetermined speed, and
   wherein the minimum time is calculated by a distance between the door window and the visor portion calculated for each position in the longitudinal direction of the visor portion covering the door window, and by a movement speed for each position of the door window corresponding to each position in the longitudinal direction of the visor portion covering the door window according to the opening of the door.

2. The door visor of claim 1, wherein the body portion further comprises a protrusion provided between the molding portion and the visor portion.

3. The door visor of claim 1, further comprising an adhesive portion attaching the molding portion to the vehicle body,
   wherein the molding portion includes a depression, and
   the adhesive portion is provided in the depression or provided to both the depression and a periphery of the depression.

4. A door visor mounted on a vehicle having a door without an upper frame, the door visor comprising a body portion,
   wherein the body portion includes:
   a molding portion mounted on a vehicle body of the vehicle; and
   a visor portion connected to the molding portion and covering a portion of an upper portion of a door window in a state of being spaced apart from the door window based on a state where the door of the vehicle is closed and the door window of the door is closed,
   wherein the door visor further comprises an adhesive portion attaching the molding portion to the vehicle body,
   wherein the molding portion includes a plurality of depressions having different depths, and
   wherein the adhesive portion is provided in any one selected from the plurality of depressions and provided to adjacent depressions among the plurality of depressions.

5. A door visor mounted on a vehicle having a door without an upper frame, the door visor comprising a body portion,
   wherein the body portion includes:
   a molding portion mounted on a vehicle body of the vehicle; and
   a visor portion connected to the molding portion and covering a portion of an upper portion of a door window in a state of being spaced apart from the door window based on a state where the door of the vehicle is closed and the door window of the door is closed,
   wherein the door visor further comprises an adhesive portion attaching the molding portion to the vehicle body,
   wherein the adhesive portion includes at least one perforated line provided to be parallel in a longitudinal direction, and
   wherein the adhesive portion is provided to have an uneven thickness in a width direction.

6. The door visor of claim 1, wherein a maximum width of the visor portion covering a portion of the upper portion of the door window is set to be shorter than a reference height, and
   the reference height is calculated based on a descending height of the door window which descends by a predetermined height when the door of the vehicle is closed and the door is opened in a state where the door window is closed.

* * * * *